United States Patent [19]
Melocik et al.

[11] Patent Number: 4,514,665
[45] Date of Patent: Apr. 30, 1985

[54] CURRENT LIMIT CONTROL CIRCUIT

[75] Inventors: Grant C. Melocik, Chardon; William Pickering, University Heights, both of Ohio

[73] Assignee: Towmotor Corporation, Mentor, Ohio

[21] Appl. No.: 455,720

[22] Filed: Jan. 5, 1983

[51] Int. Cl.³ .......................... H02P 1/00; H02H 3/24
[52] U.S. Cl. ................................ 318/139; 318/345 E; 361/90
[58] Field of Search .................... 361/23-25, 361/27, 30, 31, 33, 88, 90, 91, 93, 100, 101, 103; 318/138, 139, 345 E

[56] References Cited
U.S. PATENT DOCUMENTS

| 3,230,440 | 1/1966 | Kleiner | 361/90 |
| 3,373,341 | 3/1968 | Wattson | 361/100 X |
| 3,426,265 | 2/1969 | Till | 361/101 X |
| 3,551,773 | 12/1970 | Dannettell et al. | 318/341 |
| 3,596,154 | 7/1971 | Gurwicz et al. | 318/52 |
| 3,624,474 | 11/1971 | Nolf | 318/331 |
| 3,842,317 | 10/1974 | Mattes et al. | 361/100 |
| 3,868,554 | 2/1975 | Konrad | 318/434 |
| 4,090,116 | 5/1978 | Lippitt | 318/345 E |
| 4,378,517 | 3/1983 | Morton et al. | 318/139 X |

FOREIGN PATENT DOCUMENTS 3120083 3/1982 Fed. Rep. of Germany .
WO81/03249 11/1981 PCT Int'l Appl. .

OTHER PUBLICATIONS

Applications filed simultaneously herewith by Grant C. Melocik et al., for Short Circuit Protection Apparatus; Diagnostic Display Apparatus; Anti-Rollback Control; Dual-Motor Control Apparatus; Coil and Coil Driver Control Apparatus; Motor Speed Control Apparatus; and Plugging Electrical Braking Control Circuit.

Primary Examiner—Ulysses Weldon
Attorney, Agent, or Firm—Stephen L. Noe

[57] ABSTRACT

Apparatus (10) is provided for controlling current through a motor (12), including a circuit (14) for generating motor speed command data, a circuit (26) for generating a control signal in response to a maximum value of current through the motor (12), a programmable data processor (72) for generating pulse trains in response to the command data, and a controllable supplying circuit (18) for coupling and decoupling power to the motor (12) in response to the pulse trains and for decoupling power to the motor (12) in response to the control signal independent of the pulse trains. By decoupling power from the motor (12) independent of the control produced by the data processor (72), the current limit is achieved even if the data processor (72) malfunctions, contrary to prior apparatus.

1 Claim, 5 Drawing Figures

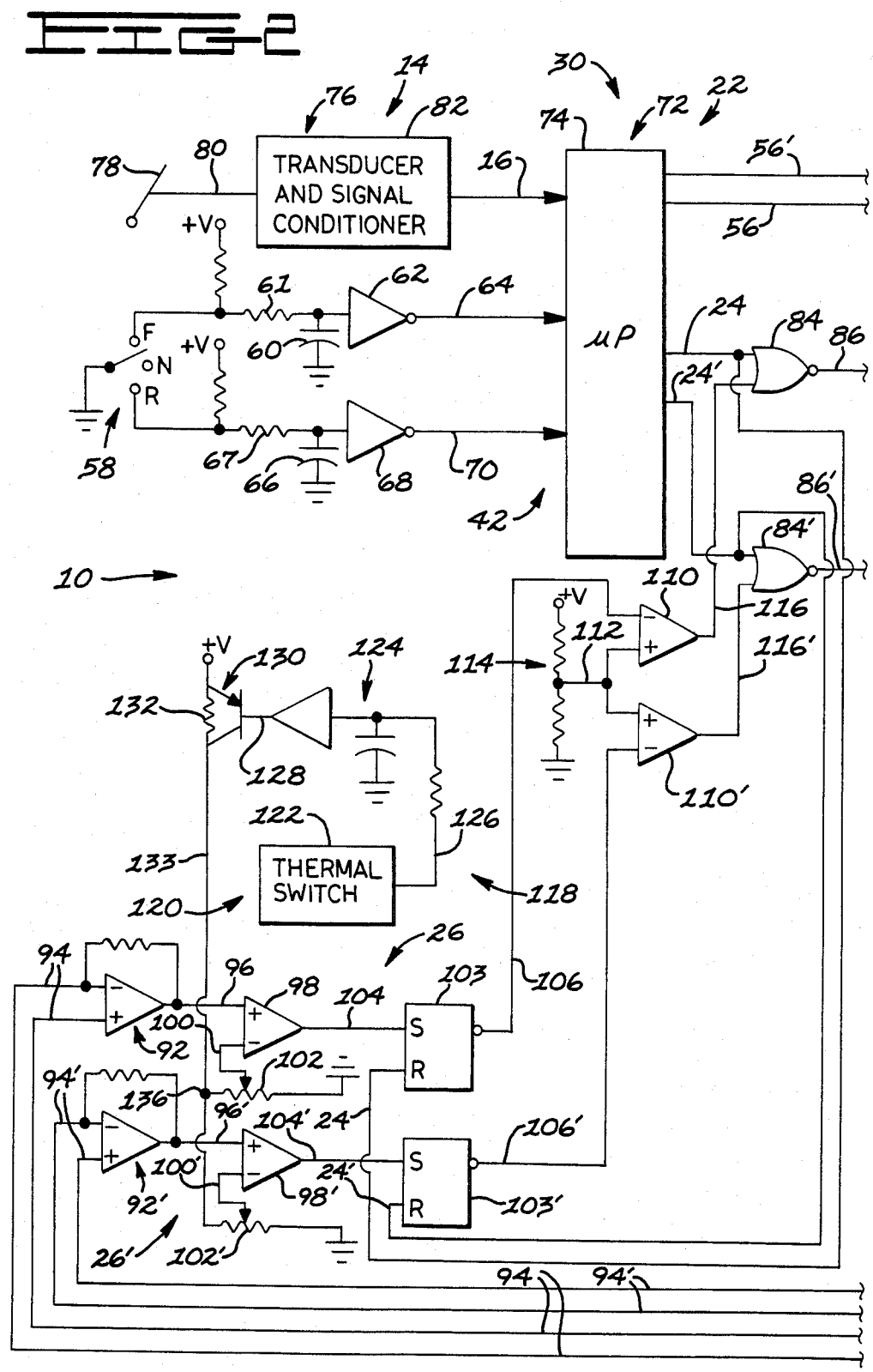

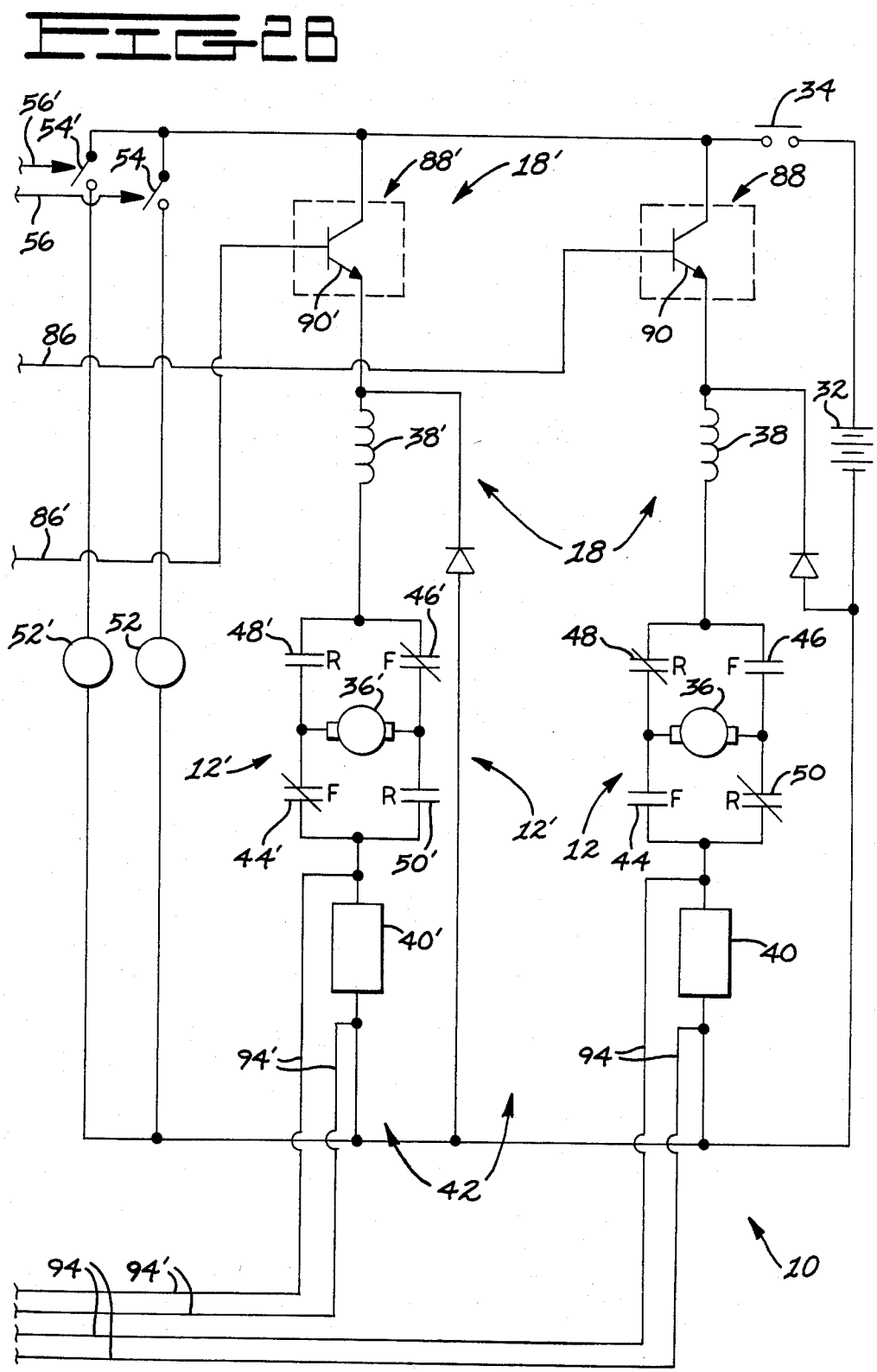

CURRENT LIMIT CONTROL CIRCUIT

DESCRIPTION

1. Technical Field

This invention relates generally to a power supply control apparatus and, more particularly, to apparatus for limiting current through a motor.

2. Background Art

Current limit control circuits are well-known for limiting current flow through a device. For example, a wide variety of current limit control circuits are employed to limit current flow through a motor to a preselected maximum value. The current limit control circuits may be used in conjunction with, for example, motor speed control circuits. Should excessive current flow through the motor at any motor speed, the current limit control circuits will limit the flow to the preselected maximum value.

Typically, a motor speed control circuit is a chopper or pulse control that has a pulse generator, such as a voltage controlled oscillator (VCO), and an on-off power coupling element, such as a power transistor, in series with the motor. The transistor is pulsed on and off in response to the output pulse train of the pulse generator. The pulse generator controllably produces pulse trains in response to control signals which represent desired or commanded motor speeds. The typical current limit control circuit senses current through the armature of the motor and, in response to excessive current flow, modifies these control signals and causes the pulse generator to output pulse trains representing a reduced motor speed.

One problem with prior current limit control circuits is that current limit control is directly coupled or tied to motor speed control. That is, when motor current flow exceeds the preselected maximum value, the pulse generator, whose primary function is motor speed control, is controlled to modify the motor speed control information. A disadvantage is that a malfunction of the pulse generator can render the current limit control ineffective.

Furthermore, prior motor speed and current limit control circuits have the disadvantage of utilizing analog and/or discrete component design concepts. They are also relatively complicated, slow, and not cost-effective.

The present invention is directed to overcoming one or more of the problems as set forth above.

DISCLOSURE OF THE INVENTION

In one aspect, the present invention includes an apparatus for controlling the supply of power to a motor, including means for generating a plurality of different motor speed signals, each in response to a respective motor speed command, controllable supplying means for delivering motor speed control signals to the motor, and first transducer means for supplying a current signal in response to the magnitude of current flowing through the motor. The improvement comprises first means for receiving the command signals generating respective motor speed control signals in response to the command signals, and delivering the control signals to the supplying means, and second means for receiving the current signal, generating a blocking signal in response to the current signal exceeding a preselected value, and delivering the blocking signal to the supplying means.

Prior control circuits interconnect or couple the motor speed control and current limit control so that, for example, a malfunctioning pulse generator may prevent current limit control. The present invention performs current limit control independently of motor speed control and utilizes state-of-the-art technology which is cost-effective, simple, reliable and fast.

BRIEF DESCRIPTION OF THE DRAWINGS

For a better understanding of the present invention, reference may be made to the accompanying drawings in which:

FIG. 2 and FIG. 2B are a schematic illustration of an overall motor control system incorporating the present invention;

BEST MODE FOR CARRYING OUT THE INVENTION

Figure 1:
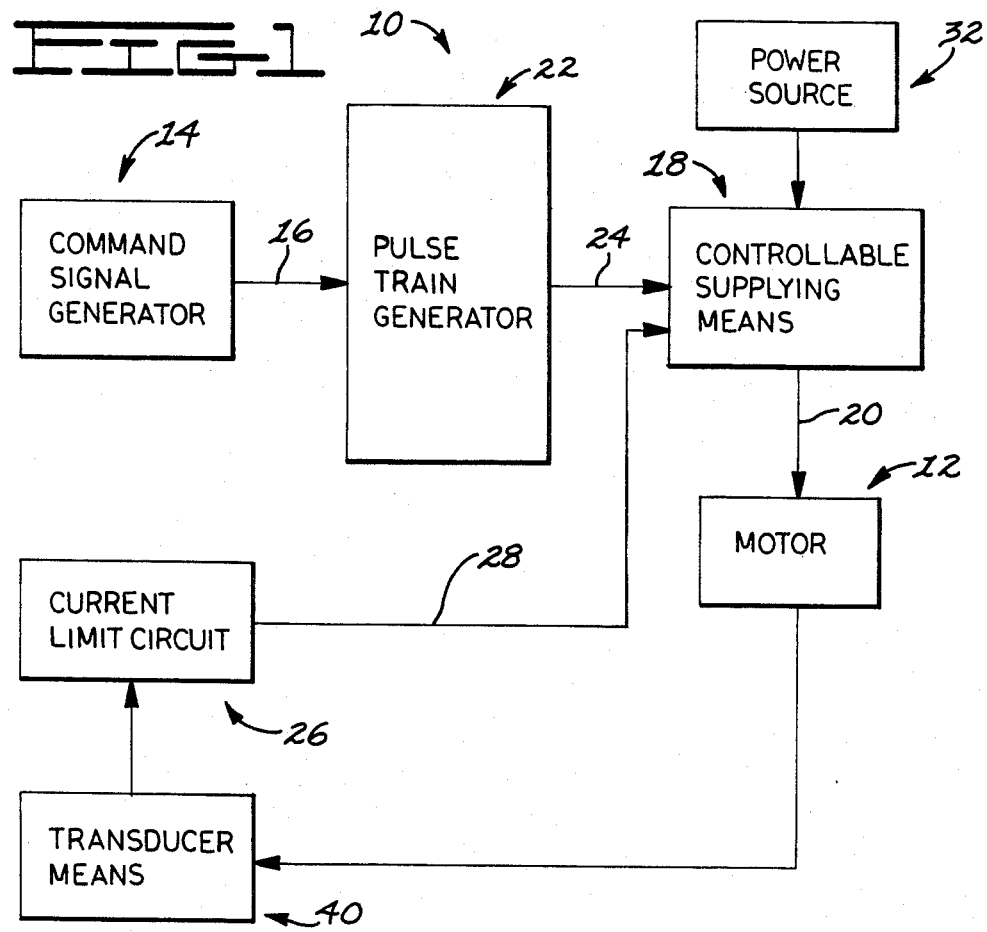
FIG. 1 is a block diagram of one embodiment of the present invention.

FIG. 1 illustrates an apparatus 10 for controlling the supply of power to a motor 12. The apparatus 10 is designed to perform the function of motor speed control and motor current limit control. Consequently, the apparatus 10 includes a power source 32, and a means 14 for generating a plurality of different motor speed command signals on an output line 16 each in response to a respective motor speed command. The apparatus 10 also includes a controllable supplying means 18, coupled to the motor 12 via a line 20, for delivering motor speed control signals to the motor 12, and responsively coupling power to the motor 12, and a first means 22 for receiving the command signals, generating respective motor speed control signals in response to the command signals, and delivering the control signals to the supplying means 18 via a line 24 to couple and decouple power to the motor 12.

The apparatus 10 further includes a first transducer means 40 for supplying a current signal in response to the magnitude of current flowing through the motor 12 and a second means 26 for receiving the current signal, generating a blocking signal on a line 28 in response to the current signal exceeding a preselected value, and delivering the blocking signal to the controllable supplying means 18 to selectively decouple power to the motor 12 in response to the control signal, with the second means 26 being independent of the first means 22. The line 28 bypasses the means 22 and acts, in addition to the line 24, as a control input to the supplying means 18. Therefore, the supplying means 18 is controlled by the second means 26 for decoupling power to the motor 12 independently or irrespective of the first means 22, as will be further described. Thus, the control produced by the second means 26 will continue to operate should the first means 22 malfunction or otherwise fail by, for example, calling for unwanted maximum power and corresponding motor speed.

FIG. 2 shows the apparatus 10, including the motor speed command signal generating means 14, the controllable supplying means 18, the first means 22, the transducer means 40, and the second means 26, as part of an overall apparatus or motor control system shown generally as 30. Since the principles of the present invention can be applied to simultaneously control a plurality of motors, a second motor 12' is shown for exemplary purposes. The second motor 12' is similar to the first motor 12.

The control system 30 includes the power source 32, such as a vehicle battery $V_{BAT}$, that supplies power to the motors 12 and 12' through a normally open line contact 34. The motor 12 includes an armature 36 and a field winding 38 that are in series connection with a shunt 40. The motor 12' has components similar to the motor 12, including an armature 36' and a field winding 38', with a series connected shunt 40'.

A means 42 for controlling the direction of energization of the motor 12 is part of the control system 30 and includes normally open forward contacts 44 and 46, together with normally closed reverse contacts 48 and 50. A directional contactor coil 52, which controls the state of the contacts 44,46,48,50, and an on-off switch 54, such as a transistor which is controlled by the output of the first means 22 on a line 56, are in series connection with the power source 32. When the switch 54 is closed, the coil 52 is energized to change the state of the contacts 44,46,48,50 from that shown. When the switch 54 is opened, the coil 52 is deenergized to return the contacts 44,46,48,50 to the normal state shown.

The means 42 also includes similar components for controlling the direction of energization of the motor 12'. The means 42 includes forward contacts 44',46' and reverse contacts 48',50' whose state is controlled by the energization and deenergization of a contactor coil 52' in series with a switch 54' which is controlled by the first means 22 over a line 56'. Note, however, that the forward contacts 44,46 are normally open and the forward contacts 44',46' are normally closed. Likewise, the reverse contacts 48,50 are normally closed and the reverse contacts 48',50' are normally open.

The means 42 further includes a directional control switch 58 having a forward position F, a neutral position N and a reverse position R. When the switch 58 is in the neutral position, a capacitor 60 is charged from +V through a resistor 61 to a logic 1 and the output of an inverter 62 on a line 64 is responsively a logic 0, and a capacitor 66 is charged from +V through a resistor 67 to a logic 1 and the output of an inverter 68 on a line 70 is responsively a logic 0. When the directional control switch 58 is switched to the forward position F, the capacitor 60 is discharged through the resistor 61 and the switch 58 to a logic 0 so that the output on the line 64 from the inverter 62 is a logic 1. When the directional control switch 58 is switched to the reverse position R, the capacitor 66 is discharged through the resistor 67 and the switch 58 to a logic 0 so that the output on the line 70 from the inverter 68 is a logic 1.

The first means 22 includes a data processor 72 which can be, for example, a programmable microprocessor 74 that performs a number of control functions. Thus, under software control, the microprocessor 74 responds to the logic 1 on the line 64 by closing or turning on the switch 54, energizing the coil 52, changing the state of the contacts 44,46,48,50, and opening the switch 54' to ensure that the state of the contacts 44',46',48',50' is as illustrated. Therefore, the forward contacts 44,46 are closed, the reverse contacts 48,50 are opened, the forward contacts 44',46' remain closed, and the motors 12 and 12' can be energized in the same, i.e., forward direction. Under software control, the microprocessor 74 responds to the logic 1 on the line 70 by closing or turning on the switch 54', energizing the coil 52', changing the state of the contacts 44',46',48',50', and opening the switch 54 to provide the illustrated state of the contacts 44,46,48,50. Therefore, the reverse contacts 48',50' are closed, the forward contacts 44',46' are opened, the reverse contacts 48,50 are closed and the motors 12 and 12' can be energized in the same, i.e., reverse direction.

The motor speed command data generating means 14 includes a means 76 for generating digital numbers on the output line 16 representing the command speed data. For example, the numbers are 4-bit digital numbers ranging from 0000 to 1111. Each digital number in the range 0000-1111 is a different motor speed command signal for the motors 12 and 12'. For example, the number 0000 commands zero speed, the number 1000 commands half speed and the number 1111 commands full or maximum speed. Under software control, the microprocessor 74 responds to the digital numbers on the line 16 by outputting preselected pulse trains on the lines 24 and 24'. Thus, in the present example, since there are sixteen digital numbers or command speeds in the range 0000-1111, there are sixteen different preselected motor speed control signals or pulse trains that are produced on the lines 24 and 24' to rotate the motors 12 and 12' at sixteen different speeds. The sixteen different pulse trains are different in duty factor or proportion of pulse "on-time" to pulse "off-time". The range of digital numbers from 0000 to 1111 in the binary coded decimal format (BCD) is used only for convenient illustration and could be any suitably coded binary representation, for example a gray code, having a number of bits consistent with the desired precision.

As one example, the generating means 76 is coupled to an accelerator pedal 78 via a linkage 80. The generating means 76 includes a transducer and signal conditioning circuit 82 which converts positional information of the accelerator pedal 78 to any one of the digital numbers 0000-1111 on the line 16.

In operation, when the accelerator pedal 78 is fully released or not depressed, the generating means 76 responds, through the linkage 80, by outputting the digital number 0000 on the line 16. The microprocessor 74 responds by not producing any control signal or pulse train on the lines 24 and 24', and the motors 12 and 12' are shut off. When the accelerator pedal 78 is depressed to, for example, a half-speed position, the generating means 76 outputs the number 1000 on the line 16, the microprocessor 74 responds to the number 1000 on the line 16 by outputting a preselected pulse train on the lines 24 and 24' to operate the motors 12 and 12' at half speed. When the accelerator pedal 78 is depressed to, for example, a full speed position, the microprocessor 74 responds to the number 1111 on the line 16 by outputting a preselected pulse train on the lines 24 and 24' to operate the motors 12 and 12' at full pulsed speed. Table 1 shows one example of a suitable relationship between the accelerator pedal 78 position, the corresponding motor speed command signals, and the resulting pulse train duty factors The supplying means 18 includes a two-input NOR gate 84 having a first input connected to the line 24 and an output coupled via a line 86 to an on-off power switching element 88 which has a power transistor 90 connected intermediate the power source 32 and the motor 12. A two-input NOR gate 84' has a first input connected to the line 24' and an output coupled via a line 86' to an on-off power coupling switch 88' which has a power transistor 90' in series with the motor 12'. The gates 84 and 84' pass or do not pass the pulse trains on the respective lines 24 and 24' to the lines 86 and 86' in response to the state (logic 0 or logic 1) of the respective second inputs, as described below.

Assume the gates 84 and 84' are enabled to pass the respective pulse trains on the lines 24 and 24'. In response to the pulses on the lines 24 and 24' being high or logic 1, the outputs of the gates 84 and 84' on respective lines 86 and 86' are low or logic 0. As can be seen, the means 18 and 18' respond by turning off the transistors 90 and 90' and deenergizing the motors 12 and 12'. In response to the pulses on the lines 24 and 24' being low or logic 0, the outputs of the gates 84 and 84' on respective lines 86 and 86' are high or logic 1. The means 18 and 18' respond by turning on the transistors 90 and 90' to energize the motors 12 and 12'.

As previously mentioned, the second means 26 decouples power from the motors 12 and 12' in order to limit motor current to a maximum value. The means 26 includes a differential amplifier 92 having inputs 94 coupled across the shunt 40 to monitor or sense current flow through the armature 36 of the motor 12. The output voltage signal of the amplifier 92 on a line 96 is directly proportional to the armature current. An operational amplifier or comparator 98 has one input (+) coupled to the line 96 for receiving the voltage signal. Another input (−) of the comparator 98 receives a reference voltage signal on a line 100 via the output of a potentiometer 102. The reference voltage signal on the line 100 is one of two levels for reasons described below.

A latch 103 has a set input S connected to the output of the comparator 98 via a line 104. A reset input R of the latch 103 is coupled to the line 24 carrying the pulse train output of the microprocessor 74 and is reset with each logic 1 or high pulse of the pulse train. The latch 103 has an output Q coupled to a line 106, which is one input to a comparator 110. The other input to the comparator 110 receives a reference voltage signal on a line 112 from the output of a voltage divider 114. The output of the comparator 110 is coupled to a line 116 which is the other input to the gate 84.

The second means 26' has corresponding components indicated by like reference numerals for limiting current through the motor 12'. Thus, there is shown, for example, a differential amplifier 92', a comparator 98', a latch 103', and a comparator 110'.

In the operation of the second means 26, assume that the reference voltage signal on the line 100 is at a value corresponding to the preselected maximum allowable motor current. If the current through the armature 36 of the motor 12 does not exceed the maximum value, the signal on the line 96 from the differential amplifier 92 is lower than the signal on the line 100, resulting in a logic 0 on the line 104. This logic 0 is stored in the latch 103 and produces the logic 1 on the line 106 that is supplied as one input to the comparator 110. Note that each pulse of the pulse train on the line 24 resets the latch 103, but since a logic 0 resides continually on the line 104 as long as the maximum current has not been reached, the latch 103 remains set to provide the logic 1 on the line 106. Since the other reference voltage signal input on the line 112 to the comparator 110 is lower than the logic 1 on the line 106, the output of the comparator 110 is a logic 0 on the line 116 which constitutes one input to the gate 84. Therefore, the output of the gate 84 on the line 86 follows the waveform of the pulse train on the line 24 and biases the transistor 90 on and off. A low pulse or logic 0 on the line 24 ultimately turns on the transistor 90 and a high pulse or logic 1 on the line 24 ultimately turns off the transistor 90.

Assume now that the current through the armature 36 of the motor 12 exceeds the preselected maximum value, and the signal on the line 96 exceeds the signal on the line 100, resulting in a logic 1 being output on the line 104. In response, the latch 103 stores this logic 1 to provide a logic 0 on the line 106 as an input to the comparator 110. Since the other reference voltage signal input to the comparator 110 on the line 112 is now higher than this logic 0, the output of the comparator 110 on the line 116 is logic 1. Therefore, the output of the gate 84 on the line 86 is continually a logic 0, irrespective of the pulse train on the line 24, and turns off the transistor 90. Thus, in response to the current in the motor armature 36 exceeding the maximum value, as selected by the reference voltage signal on the line 100, the transistor 90 is turned off to stop the supply of current to the motor 12 until the current falls below this maximum value. Thus, the output of the comparator 110 on the line 116 is the blocking signal supplied to the gate 84 for controllably modifying the pulse trains delivered by the first means 22.

It can now be appreciated that the other components of the second means 26' function in the same manner to monitor and control the current through the armature 36' of the motor 12'. Therefore, the output of the comparator 110' enables or disables the gate 84' to pass or not pass the pulse trains on the line 24' to the line 86'.

As previously mentioned, the latch 103 is reset with the pulses of the pulse trains on the line 24. This resetting is performed since it is desirable to often check the current limit condition, such as with each pulse. Should the first means 22 malfunction by, for example, outputting the maximum speed pulse train on the line 24 irrespective of the value of the digital number on the line 16, and if the preselected maximum motor current is reached, the second means 26 will operate to limit the motor current in the presence of the malfunction.

Another condition, other than a motor overcurrent condition, that can occur and make it desirable to limit current through the motors 12 and 12' is an undesirable thermal condition. That is, motor current flow should be limited in the event of overheating the power switching element 88 including the transistor 90 or the switching element 88' including the transistor 90'. Consequently, a means 118 for protecting the elements 88 or 88' against overheating can advantageously be added to the second means 26 and 26'.

The means 118 includes a transducer means 120, such as a thermal switch 122, for supplying a temperature signal in response to the temperature of the supplying means 18 exceeding a preselected value, and means 26 for generating the blocking signal in response to receiving the temperature signal.

The thermal switch 122 is located adjacent the supplying means 18, for example, on a heat sink associated with the transistors 90 and 90'. A signal conditioning circuit 124 conditions an output signal on a line 126 from the transducer means 120 to produce the conditioned signal on an output line 128. A transistor 130, having a resistor 132 coupled across its emitter and collector, is biased in response to the conditioned signal on the line 128. The collector of the transistor 130 is connected to the potentiometers 102 and 102' via a line 133.

In operation, if the power switching elements 88 and 88' have not overheated, the output of the thermal switch 122 on the line 126 is at logic 0, which is coupled via the conditioning circuit 124 onto the line 128 for holding the transistor 130 on. In response, a voltage +V is coupled through the transistor 130, bypassing the resistor 132, onto the line 133 and then to the potentiometers 102 and 102', setting the reference voltage signal on the lines 100 and 100' to the preselected value for current limit control of current through the armatures 36 and 36', as previously described.

However, should the switch 88 or 88' overheat, a logic 1 is produced on the line 126 by the thermal switch 122. The logic 1 is conditioned by the conditioning circuit 124 and output on the line 128 to bias off the transistor 130. In response, a voltage +V is coupled through the resistor 132 onto the line 133. A voltage drop occurs across the resistor 132. This results in a lower voltage on the line 133 and a lower reference voltage signal on the lines 100 and 100' than that resulting from transistor 130 being on. This lower reference voltage signal lowers the setting for the current limit and results in a lowered allowable maximum current flow through the motors 12 and 12'. The reduced current flow will allow the overheated switch 88 or 88' to cool.

Figure 3:
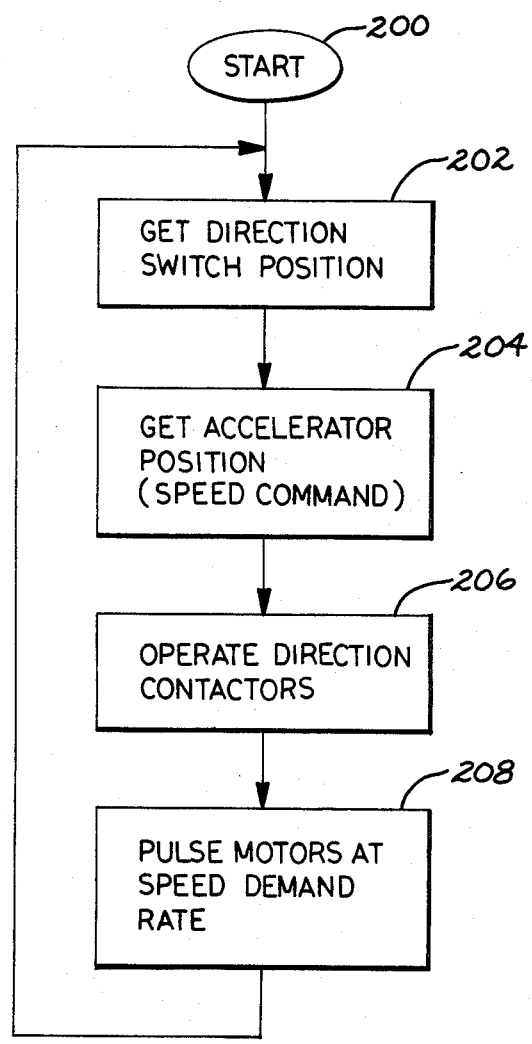
FIG. 3 is a flowchart used to explain the software of an embodiment of the present invention; and, FIG. 4 is a schematized top view of an electric vehicle having the motor control system of FIG. 2.

FIG. 3 is a flowchart of a computer program suitable for controlling the apparatus 10. Only the software routines required to implement one embodiment of the present invention are described herein. Sufficient detail is presented to allow one skilled in computer programming to write the required program to implement the flowchart for any common microprocessor, for example, the microprocessor produced by MOSTEK Corporation of Carrollton, Tex. and designated by the part number 3870. Upon beginning the flowchart of FIG. 3 at the block 200 labeled START, program control progresses through the following sequence:

In the block 202, the microprocessor 74 inputs the information that is received on the lines 64,70 in response to the direction switch 58 position. Next, in the block 204, information received on the line 16 relating to the accelerator pedal 78 position or speed demand is also input by the microprocessor 74. Control signals are then passed, in the block 206, to the switches 54,54' to drive the direction contactor coils 52,52' for vehicle 136 operation in the direction selected by the direction switch 58.

Finally, in the block 208, the microprocessor 74 determines, either by calculation or from a look-up table stored in memory, appropriate pulse train waveforms to output on the lines 24,24' to operate the vehicle 136 at the speed demanded by the accelerator pedal 78 position. An example of a suitable relationship between the accelerator pedal 78 position, motor speed command signals, and pulse train duty factors is shown in Table 1. Control is then transferred back to the block 202 for the next program iteration.

Figure 4:
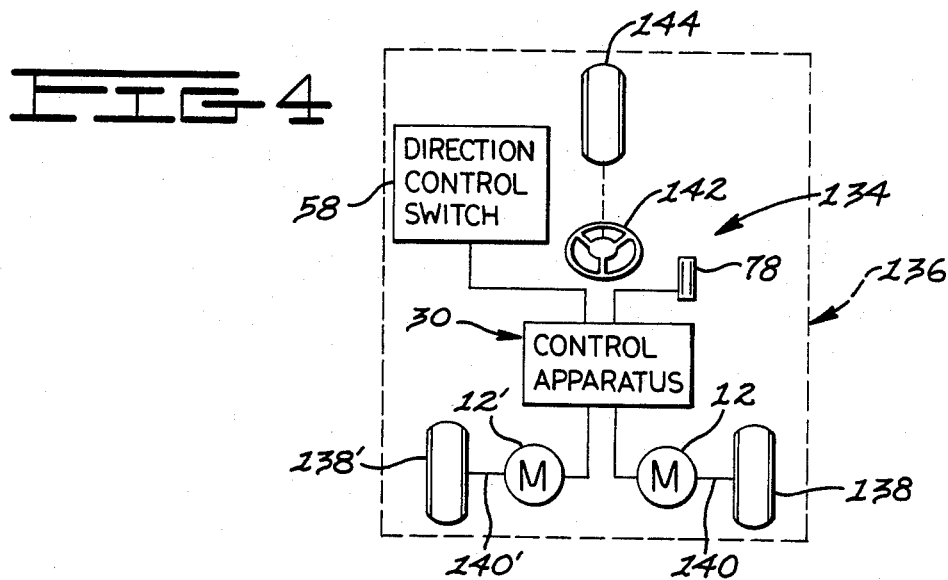

FIG. 4 shows an overall vehicle control system 134 for an electric vehicle 136, such as an electric fork lift truck, having a left drive wheel 138 and a right drive wheel 138'. The motor 12 will rotate the drive wheel 138 through a shaft 140 and the motor 12' will rotate the drive wheel 138' through a shaft 140'. The control system 30 controls the energization and deenergization of the motors 12 and 12' in the manner previously described in response to the directional control switch 58 and the accelerator pedal 78. Also shown is a steering wheel 142 and a steerable wheel 144 conventionally used on three-wheeled vehicles for controlling the steering of the vehicle 136.

TABLE 1

| Accelerator Pedal Position (% of Maximum) | Motor Speed Command Signals | Pulse Train Duty Factors (%) |
|---|---|---|
| 0.00 | 0000 | 0.00 |
| 6.67 | 0001 | 6.25 |
| 13.33 | 0010 | 12.50 |
| 20.00 | 0011 | 18.75 |
| 26.67 | 0100 | 25.00 |
| 33.33 | 0101 | 31.25 |
| 40.00 | 0110 | 37.50 |
| 46.67 | 0111 | 43.75 |
| 53.33 | 1000 | 50.00 |
| 60.00 | 1001 | 56.25 |
| 66.67 | 1010 | 62.50 |
| 73.33 | 1011 | 68.75 |
| 80.00 | 1101 | 75.00 |
| 86.67 | 1101 | 81.25 |
| 93.33 | 1110 | 87.50 |
| 100.00 | 1111 | 93.75 |

INDUSTRIAL APPLICABILITY

In the overall operation of the vehicle 136 and the vehicle control system 134, assume, for example, that the directional control switch 58 is in the forward position F and that the accelerator pedal 78 is at a half-speed position. The microprocessor 74 has received the logic 1 data signal on the line 64 and the digital number 1000 on the line 16. Consequently, the microprocessor 74 has closed the switch 54 to energize the coil 52 and is producing the pulse train on the lines 24 and 24' corresponding to half-speed. As a result, the motors 12 and 12' are being energized to move the vehicle 136 in the forward direction at half speed.

Then, for example, should the accelerator pedal 78 be released to a quarter speed position or depressed to a full speed position, the microprocessor 74 will respond to the respective digital numbers on the line 16 to generate the corresponding pulse trains on the lines 24 and 24', thereby energizing the motors 12 and 12' to drive the vehicle 136 at quarter speed or full speed.

A similar speed and directional control will occur should the directional control switch 58 be in the reverse position R and the accelerator pedal 78 be depressed to various positions.

In response to the current through the motors 12 or 12' exceeding a preselected maximum value, the second means 26 and 26' will limit this current, irrespective of the magnitude of current or power that would otherwise be coupled to the motor 12 or 12' due to the pulse train on respective lines 24 and 24'. The maximum value can be a relatively high or low value depending on whether the power switching elements 88 or 88' overheat, as determined by the means 118.

In summary, the apparatus 10 and the overall motor control system 30 have the advantage of limiting motor current whenever an overcurrent condition occurs, irrespective of the control signals produced by the means 22. Thus, the current can be limited even if means 22 were to fail or function improperly. Moreover, motor current is also limited if other conditions occur, particularly if the power switching elements 88 or 88' overheat. Furthermore, the apparatus 10 and the motor control system 30 utilize the advantages of digital data processing and logic network design, including the microprocessor 74 and the various logic gates and latches, to perform the various control functions. These components can be manufactured as integrated circuits and provide an overall system that is reliable, cost-effective and fast.

Other aspects, objects and advantages of the present invention can be obtained from a study of the drawings, the disclosure and the appended claims.

We claim:

1. Apparatus (10) for controllably energizing a motor (12), comprising:
   a DC electric power source (32) controllably connected to said motor (12);
   generating means (14) for producing a predetermined plurality of incremental coded digital motor speed command signals;
   first means (22) for receiving said digital motor speed command signals and producing respective predetermined pulse trains in response to each of said received command signals, each of said pulse trains having a predetermined duty factor;
   controllable supplying means (18) for receiving said pulse trains and delivering electric current from said power source (32) to said motor (12), said controllable supplying means (18) including a power switching element (88) connected between said power source (32) and said motor (12), and a logic gate (84) having a first input connected to said first means (22), a second input connected to a second means (26), and an output connected to said power switching element (88);
   a current shunt connected in series with said motor (12) and said power source (32), and adapted to produce a current signal in response to the magnitude of current delivered to said motor (12);
   said second means (26) for receiving said current signal and producing a digital logic blocking signal in response to said current signal exceeding a predetermined magnitude, said second means (22) including a current reference potentiometer (102);
   a differential amplifier (92) having a pair of inputs (84) connected across said shunt, and an output;
   a first comparator (98) having a first input connected to said differential amplifier (92) output, a second input connected to said reference potentiometer (102), and an output;
   a latch (103) having a first input connected to said comparator (98) output, a second input connected to said first means (22) and to said logic gate (84) first input, and an output;
   a voltage divider (114); and,
   a second comparator (110) having a first input connected to said latch (103) output, a second input connected to said voltage divider (114), and an output connected to said logic gate (84) second input; and,
   wherein said controllable supplying means (18) is adapted to receive said digital blocking signal and block the delivery of current from said power source (32) to said motor (12) in response to said received blocking signal.

* * * * *